April 4, 1950  B. CURRLIN  2,502,642
LOCK NUT
Filed Oct. 27, 1945

*INVENTOR.*
BERNARD CURRLIN
BY
*attorney*

Patented Apr. 4, 1950

2,502,642

UNITED STATES PATENT OFFICE 2,502,642

LOCK NUT

Bernard Currlin, Toledo, Ohio

Application October 27, 1945, Serial No. 624,962

1 Claim. (Cl. 151—7)

This invention relates to locking nuts and particularly to nut arrangements having a deformable insert.

An object of this invention is to produce a new and improved locking nut having a deformable insert secured therein in a manner to militate against subsequent movement relative to the nut body.

Not infrequently, those familiar with the art have used deformable members in combination with nuts. However, provisions were usually made for excessive distortion of the deformable member whereby the desired locking and sealing results were obtained. It is well known that complete recovery of said deformable member is seldom obtained and, therefore, it is necessary to either replace the deformable member or add other elements thereto when the locking nut is to be reused. As a further object of this invention, I have found it expedient to restrict the deformation of the deformable insert on tightening to that required to grip the abutting threads of the bolt and the adjacent confining walls of the nut. Therefore, my improved lock nut assembly may be repeatedly used without replacement or modification of the deformable member.

Another object of this invention is to produce a new and improved locking nut in which the deformable insert is securely positioned prior to the threading operation. A continuous helix is thereafter formed which is conducive to effortless operation and repeated application of said assembly without distortion or modification of the formed helix.

Another object of this invention is the production of a nut of the type described having a portion of the deformable insert extending beyond the face of the nut, which, when tightly seated, is deformed firmly to grip the threaded screw and to operate as a fluid or vapor seal between the nut assembly and the seat as well as between elements comprising the nut assembly.

A further object of this invention is to produce an article of manufacture comprising a minimum of cooperating elements which may be assembled in an expeditious manner to produce a simple one-piece locking nut, thereby also simplifying the use thereof.

Other objects and advantages of the invention will appear in the following description of my invention, and for purposes of illustration but not of limitation, embodiments of the invention are shown in the drawings in which.

Figure 1:
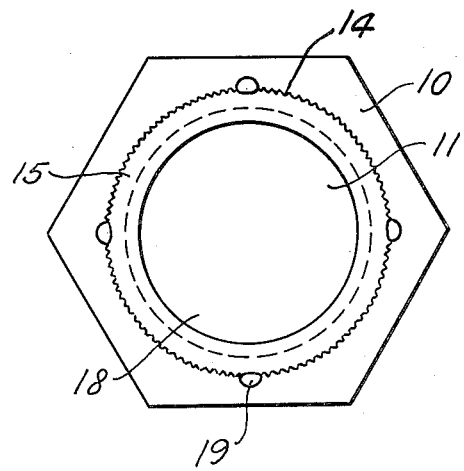
Figure 1 is a top view of the assembled lock nut prior to assembly on to a bolt or screw.
Figure 2:
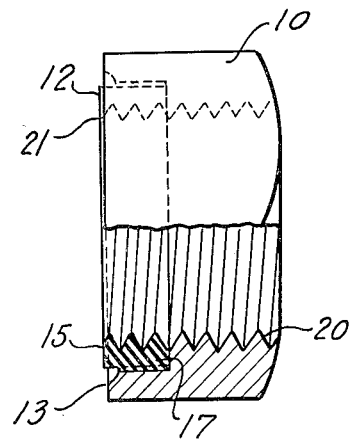
Figure 2 is a side elevation partly in section of the lock nut assembly shown in Figure 1.

The illustrated embodiment of the invention comprises a hexagonal nut 10 having a central aperture 11 which is not initially threaded for reasons which will hereinafter appear. A concentric cylindrical cavity 12 is formed in the face 13 of the nut body 10, the surface of said cylinder being serrated at 14 to firmly grip a deformable sleeve member 15 of substantially the same perimeter and which fits tightly therein, said deformable sleeve also abutting a shoulder 17 at the base of the cavity when in the assembled relation. When the sleeve is thus positioned, a sleeve aperture 18 and the equally dimensioned aperture 11 are adjacent and in registry with each other.

Retrograde movement of said sleeve 15 in relation to the nut 10 is substantially restricted by multiple ears 19 formed by peening operations upon the cavity edge subsequent to the insertion of said sleeve. The ears 19 in combination with the serrations 14 prevent the movement of said insert in relation to the nut body 10. Thus suitable threads 20 thereafter machined into the surfaces of the registered apertures 11 and 18 necessarily remain in alignment and are continuous. The continuity of the helix is important in consideration of the increased effort in operation which is necessitated for the distortion of the threaded sleeve portion which may frequently be out of line with those of the nut. Not infrequently, the displacement of such threads also makes the unit unsuitable for further applications.

I have found it expedient to have the thickness of the deformable sleeve 15 slightly greater than the depth of the cavity 12, thereby having a portion 21 of the deformable sleeve extending beyond the face of the nut. Thus, when the assembled nut is operated to firmly abut the work, the protruding portion is compressed and slightly deformed in view of the lack of voids within the assembly thereby forcing the material to firmly bear against all adjacent rigid surfaces. Thus, a vapor seal is formed between the nut assembly and the seat, between the sleeve and the screw or bolt, and between the cavity surfaces and the sleeve, thereby adapting the lock nut assembly for use in cylinder heads of internal combustion engines or other applications where a fluid-tight connection is required.

Figure 3:
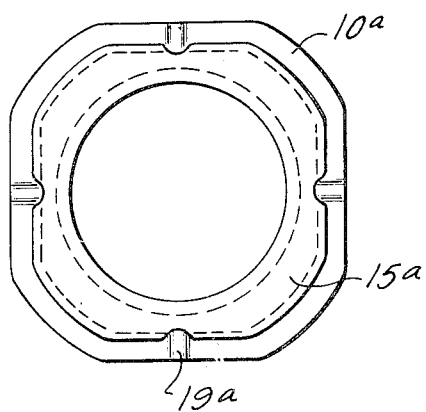
Figure 3 is a top view of another form of the invention.
Figure 4:
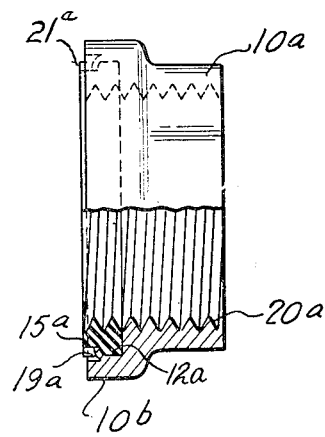
Figure 4 is a side elevation partly in section of the lock nut assembly shown in Figure 3.

The form of the invention shown in Figures 3 and 4 differs from that described above only in the means of permanently positioning the deformable sleeve in relation to the nut. Suffice it to say that a polygonal nut 10a having an enlarged portion 10b has formed in said enlarged portion a polygonal cavity 12a which retains a similarly contoured and apertured polygonal deformable disc 15a. It is manifest that the coacting surfaces of the polygonal cavity and the polygonal disc will resist rotational movement of said disc in relation to the nut. Retrograde movement is prevented by ears 19a peened or crimped from the cavity edge as previously stated. In this manner, any movement of the disc 15a in relation to the enclosing nut is simply and efficiently prevented. A helical screw thread 20a extends continuously through the bore of the nut and the insert or disc 15a, as shown on Figure 4.

As previously pointed out, it is expedient to use a deformable disc 18a having a thickness greater than the depth of the cavity 12a, resulting in an extending portion 21a when in the assembled relation.

I have found that materials suitable for the deformable member 15 or 15a should either be flexible, and/or have cold flow thereby to transpose or relate the compression produced on tightening to the other abutting surfaces. Suitable materials for this purpose are rubber-like materials including the ordinary vulcanized rubbers, zinc chloride fibers, plasticized vinyl or acetal resins, leather, laminated fibers, synthetic thermoplastic resins such as the acrylics, cellulose esters, cellulose ethers, vinyls, vinyl acetals, polyethylanes, polyamides, styrenes and the like, with or without fillers such as asbestos, wood flour, organic or inorganic fibers and flock, the above materials all being moldable or easily machineable to the desired contour and form.

From the above description, it is manifest that I have produced a new and novel lock nut having many advantages over units previously used in a like manner for assembly purposes. The elements comprising my invention are permanently pre-assembled into a simple unit thereby simplifying its use, especially in mass production applications. The lock nut has a continuously aligned thread which not only results in the reduction of the effort necessary for "screwing on" operations in assembly, but also prevents thread distortion thereby increasing the useful life of the unit. The intimate contact of the deformable member with the walls of the cavity and threads of the bolt reduces the amount of possible flow or deformation of the insert which results in the longer useful life of the insert, as well as less effort in the tightening phase of the assembly for the production of the required gripping action.

As previously pointed out, the intimate contact of the deformable member with all abutting surfaces advantageously adapts the unit for assemblies requiring a vapor seal. Of equal importance is the simplicity of design and manufacture, characteristics which further increase its usefulness.

It is to be understood that numerous changes in details of construction, arrangement, operation and choice of materials may be effected without departing from the spirit of the invention especially as defined in the appended claim.

What I claim is:

An article of manufacture comprising a metallic nut body provided with a central aperture terminating in an enlarged socket at the leading end of the body providing a substantially flat shoulder, a resilient fibrous insert in said socket abutting said shoulder at one end and having a wall portion at the opposite end projecting uniformly from the nut body, said projecting wall portion having a flat outer surface for engaging the work surface against which the nut is to be tightened, continuous screw threads in the body and insert extending from end to end, the threads on the insert being forced throughout the thickness of the insert upon tightening the nut body against the work into intimate fluid-tight contact with each of the threads of the screw with which the insert engages, and means for retaining the insert against movement relative to the nut body including a plurality of ears formed on the body and extending into the outer end portion of the socket, said ears being entirely within the confines of the body, the insert being of such compressible resilient character that upon tightening same on a screw and against the work, the insert is compressed in a general longitudinal direction causing the threads thereof intimately to bind against the threads of the screw to effect a substantially fluid-tight seal and upon loosening the nut, the insert returns to substantially its original state, thereby enabling repeated effective use thereof.

BERNARD CURRLIN.

REFERENCES CITED

The following references are of record in the file of this patent:

UNITED STATES PATENTS

| Number | Name | Date |
| --- | --- | --- |
| 234,967 | Courtenay | Nov. 30, 1880 |
| 1,016,746 | Herzog | Feb. 6, 1912 |
| 1,969,223 | Kotvis | Aug. 7, 1934 |
| 2,360,531 | Wojtan | Oct. 17, 1944 |
| 2,389,377 | Manning | Nov. 20, 1945 |
| 2,390,726 | Mitchell | Dec. 11, 1945 |
| 2,421,105 | Warren | May 27, 1947 |